(12) United States Patent
Tretter

(10) Patent No.: US 7,075,344 B2
(45) Date of Patent: Jul. 11, 2006

(54) MEASUREMENT OF THE WRITE CURRENT OF A CURRENT MODE WRITE DRIVER WHILE ENGAGED IN THE WRITING PROCESS

(75) Inventor: Larry LeeRoy Tretter, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 10/307,607

(22) Filed: Dec. 2, 2002

(65) Prior Publication Data

US 2004/0105315 A1    Jun. 3, 2004

(51) Int. Cl.
*H03K 3/00* (2006.01)

(52) U.S. Cl. .................. 327/110; 327/423; 360/46
(58) Field of Classification Search .................. 327/77, 327/89, 108, 110, 423, 588; 360/46
See application file for complete search history.

(56) References Cited

U.S. PATENT DOCUMENTS

| | | | |
|---|---|---|---|
| 5,282,094 A | 1/1994 | Ngo | 360/46 |
| 5,770,968 A | 6/1998 | Cameron | 327/538 |
| 5,822,141 A | 10/1998 | Chung et al. | 360/46 |
| 6,215,302 B1 * | 4/2001 | Carey | 324/252 |
| 6,229,376 B1 * | 5/2001 | Geysen | 327/403 |
| 6,265,905 B1 | 7/2001 | Jove et al. | 327/51 |
| 6,282,049 B1 * | 8/2001 | Cameron et al. | 360/75 |
| 6,310,740 B1 | 10/2001 | Dunbar et al. | 360/46 |
| 6,344,651 B1 * | 2/2002 | Woolaway et al. | 250/370.08 |
| 6,349,007 B1 | 2/2002 | Jiang | 360/31 |
| 6,633,441 B1 * | 10/2003 | Cheng et al. | 360/31 |

* cited by examiner

*Primary Examiner*—Kenneth B. Wells
(74) *Attorney, Agent, or Firm*—Scully, Scott, Murphy & Presser, P.C.; John C. Kennel, Esq.

(57) ABSTRACT

A system and method for measuring in real-time the current of a current mode driver circuit for writing data through a write head in tape or disk drive storage devices, the current mode driver circuit including one or more current mirror circuits for providing a current output in proportion to current through the write head during a write operation, the system comprising: device for converting the current mirror circuit current output into a first voltage; device for generating a second voltage representing a reference current; and, a device for comparing the first voltage value to the second voltage and generating an output signal indicating a ratio of the first and second voltages, the ratio being a measure of the current output of the current mirror circuit.

14 Claims, 5 Drawing Sheets

US 7,075,344 B2

MEASUREMENT OF THE WRITE CURRENT OF A CURRENT MODE WRITE DRIVER WHILE ENGAGED IN THE WRITING PROCESS

BACKGROUND OF THE INVENTION

1. Field of the Invention

The present invention relates generally to write head drivers for physical data storage devices such as tape drives, hard disk drives, and the like, and particularly, to a novel current mode write head driver provided with current measurement capability while performing a write operation.

2. Description of the Prior Art

In write head drivers there is a requirement to measure and monitor the write current during the write operation. For the case of voltage mode write head drivers this is done by measuring the voltage applied to the write circuit. This is easily accomplished because the write current is determined by the external resistance in series with the write head. For the case of current mode write drivers another method must be used to measure the current.

FIG. 1 illustrates a simple voltage mode write driver circuit 20 according to the prior art. For this write driver, the current Ih through the write head is determined by the value of the resistors R1, R2, and the voltage source V1 22 assuming that the NFET devices M1, M2, and PFET devices M3, M4 have a low voltage drop from source to drain when they are turned on. Neglecting the voltage drop in the FET devices and the write head, the current through the head, Ih, is just Ih=V1/(R1+R2).

FIG. 2 illustrates a simple current mode write driver circuit 50 according to the prior art. For this driver, the current through the write head L1 is determined by the value of the current source I1 52. It is understood that no resistors are in series with the write head, L1. For this current mode driver the current through the write head, L1, is not a function of the voltage V1 22.

It would be highly desirable to provide a system and method that enables the measurement of the current through the write head during the write operation.

SUMMARY OF THE INVENTION

It is an object of the present invention to provide a system and method that permits the measurement and monitoring of the current flowing in a current mode write driver during a write operation.

According to the principles of the invention, there is provided a system and method for measuring in real-time the current of a current mode driver circuit for writing data through a write head, the current mode driver circuit including one or more current mirror circuits for providing a current output in proportion to current through the write head during a write operation, the system comprising: means for converting the current mirror circuit current output into a first voltage; means for generating a second voltage indicative of a reference current; and, a means for comparing the first voltage value to the second voltage and generating an output signal indicating a ratio of the first and second voltages, the ratio being a measure of the current output of the current mirror circuit.

Advantageously, the current mode write driver circuit of the invention enables the measurement of the write current in "real time", i.e., during a write operation.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENT

Figure 1:
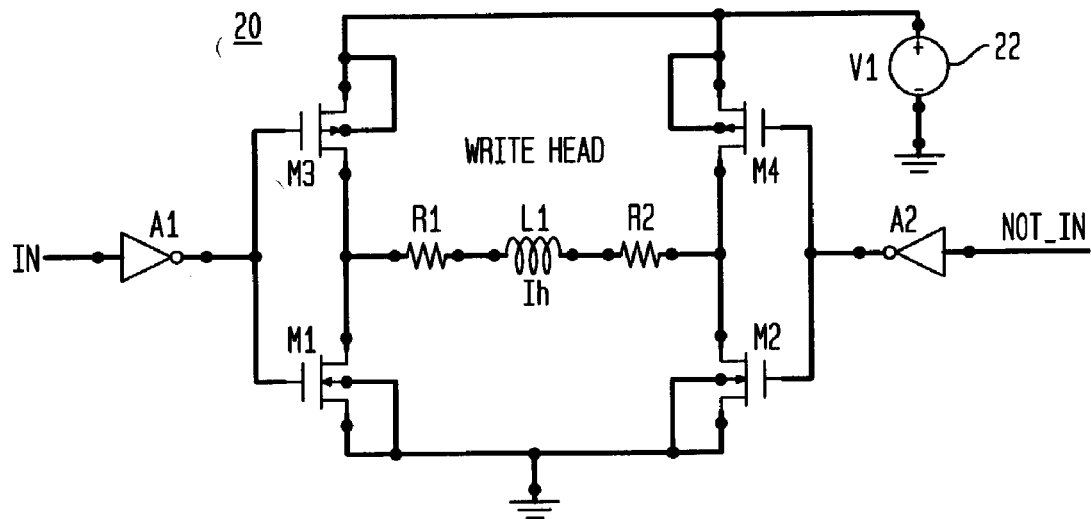
FIG. 1 depicts generally a simple voltage mode write driver circuit 20 according to the prior art.
Figure 2:
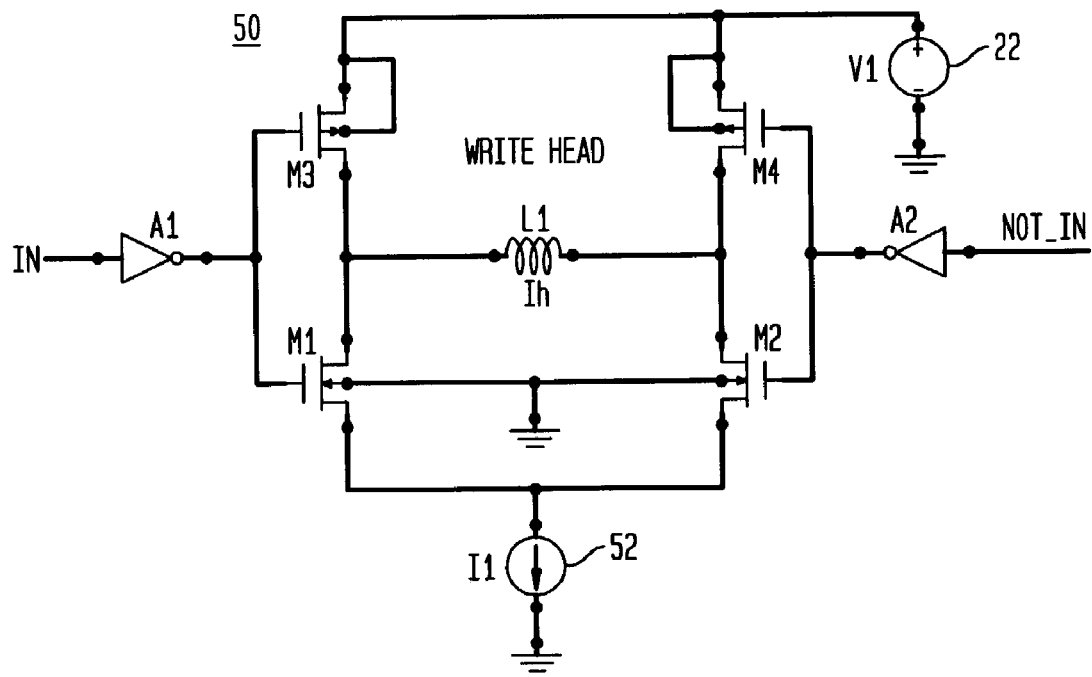
FIG. 2 depicts generally a simple current mode write driver circuit 50 according to the prior art.
Figure 3A:
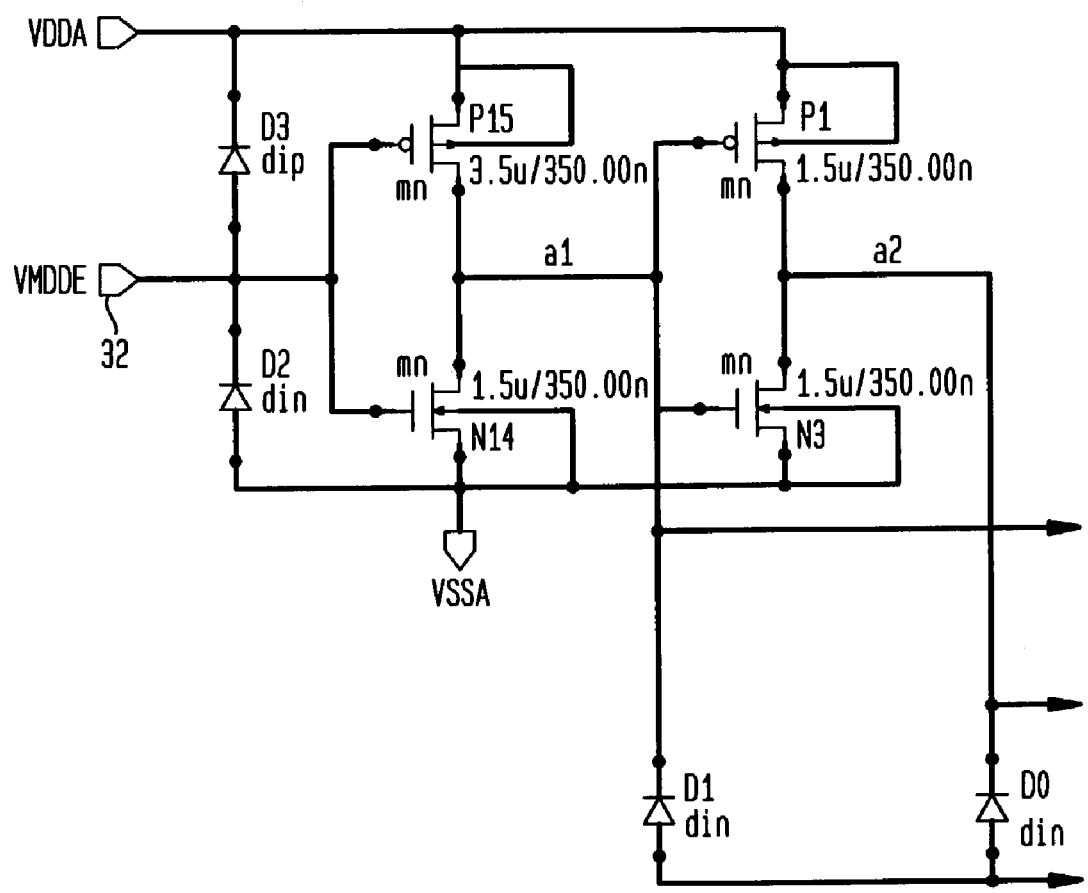
FIGS. 3(a)–3(c) illustrates a current mode write driver circuit 100 of the invention that allows for the sampling of the write current during the write operation; and, FIG. 4 depicts generally the measurement circuit utilizing an Analog to Digital Converter according to the preferred embodiment of the invention.
Figure 3B:
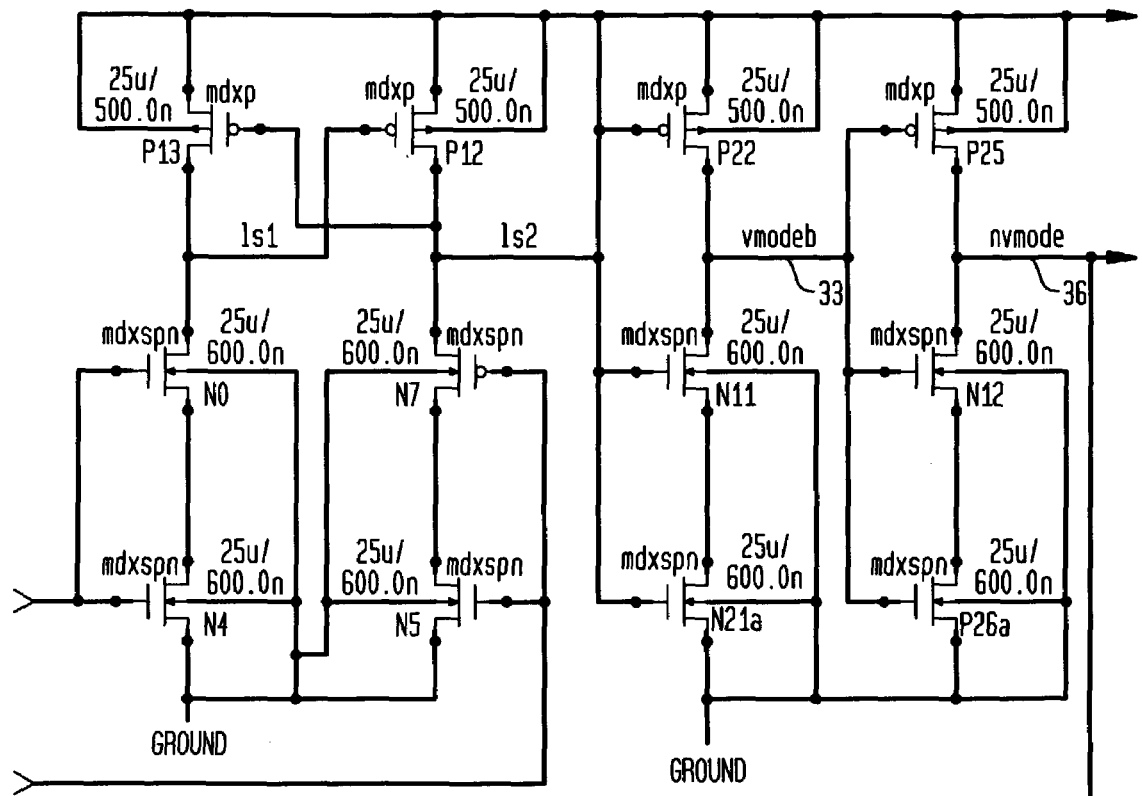
Figure 3B:
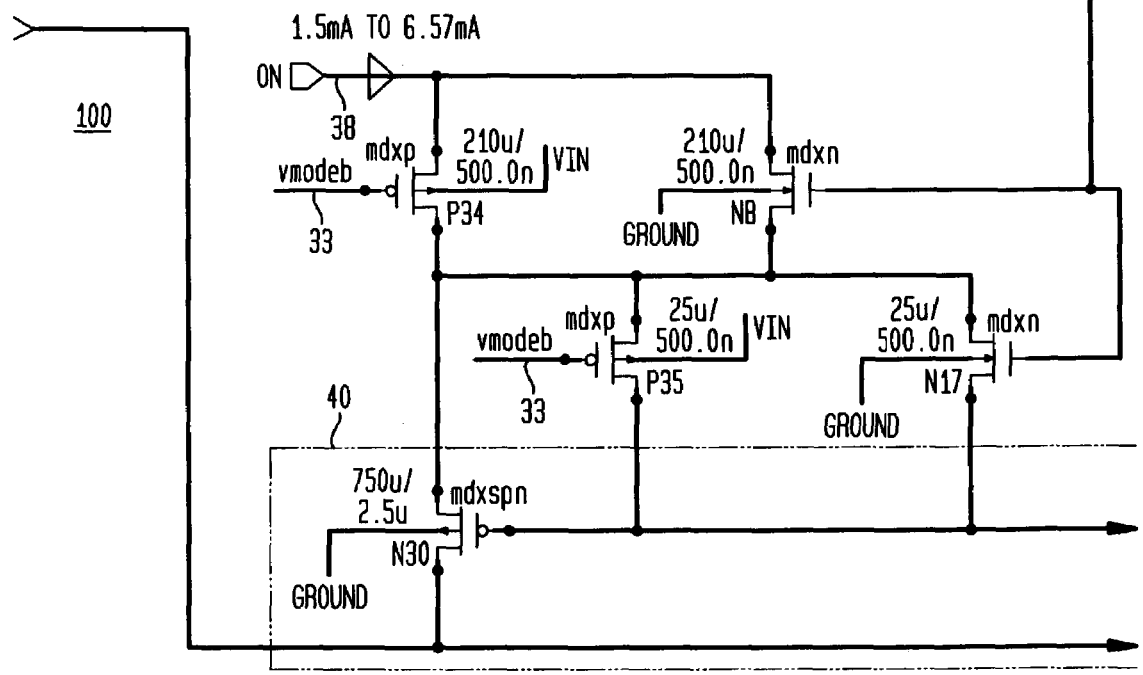
Figure 3C:
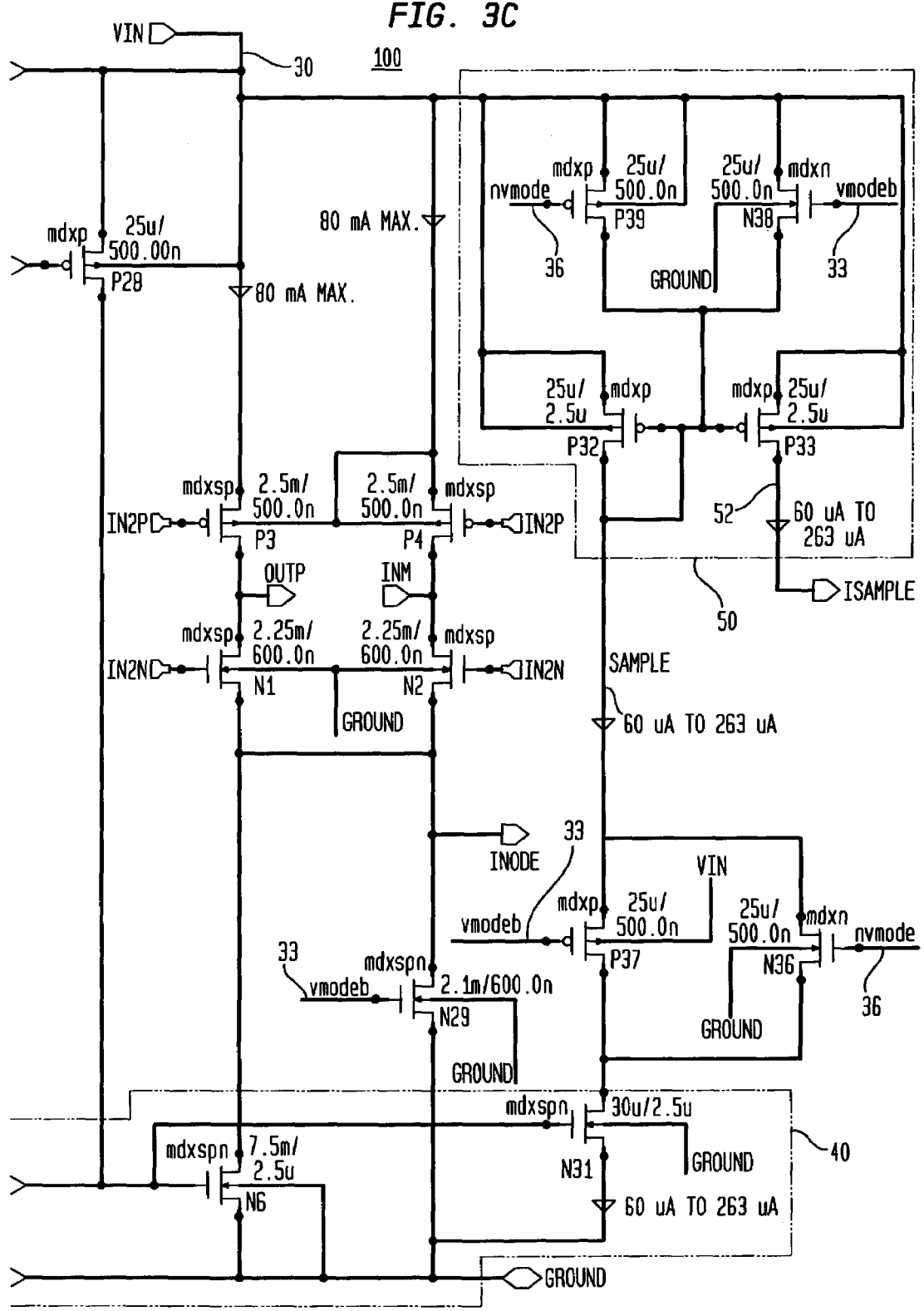

FIGS. 3(a)–3(c) illustrates a current mode write driver circuit 100 of the invention that will allow the sampling of the write current during the write operation. In a preferred embodiment, the write driver circuit 100 is of the dual-mode type. For the circuit 100, the value of the circuit voltage VIN 30 may range from 2.8 volts to 5.25 volts, for example. The value of GROUND is 0 volts and the value of VSSA is 0 volts. The output of the current mode write driver are pins OUTP and INM.

When the circuit is to function as a current mode write driver the control signal, VMODE 32, is at a logic zero (0 volts). This means that each node 33 labeled "vmodeb" is at the GROUND potential and each node 36 labeled "nvmode" is logic 1, e.g., at the same potential as VIN. Given this condition, as shown in FIG. 3(b), the PFET devices P34, P35 and NFET devices N8, N17 are turned "on". Devices P34, N8 and P35,N17 are configured as transfer devices that function as analog switches. In FIG. 3(c), the PFET device P28 is turned "off" and the NFET device N29 is turned "off". This results in NFET devices N30, N6, and N31 being connected and function as a current "mirror" 40. Thus, a reference current applied at node IIN 38 (FIG. 3(b)) is mirrored at transistor devices N6 and N31. In this configuration, devices P35, N17 are on on essentially connecting the drain to the gate of device N30 so it functions as a reference device for the current mirror 40. Device N6 functions as the device that is mirroring the current at N30.

Additionally, as shown in FIG. 3(c), the transfer function comprising gates P37, N36 are turned "on" and the transfer function comprising P39, N38 are turned "off" which will allow current to flow from PFET device P32 to NFET device N31 and for devices P32, P33 to also function as a current mirror 50. As gate P32 has its drain connected to its gate, it functions as a reference device for the current mirror 50 and P33 functions as the device that is mirroring the current at P32.

When the reference current is applied at IIN 38, which as shown in FIG. 3(b) ranges from 1.5 milliamps to 6.57 mA but is assumed for purposes of discussion to be 1.5 milliamps, then the current mirror formed by devices N30, N6 will produce 15 milliamps at device N6. This is due to the ratio of the channel width of device N6 which is 10 times larger (about 7.5 mm) as compared to the channel width of the reference device N30 (about 750 μm) as shown in FIGS. 3(b) and 3(c). Likewise, due to the channel width of device N31 (about 30 μm) and the current mirror formed of devices N30, N31 there is produced approximately 60 microamps (μA) at device N31. It should be understood that devices N30, N6 and N31 all have the same length of 2.5 μm.

As further shown in FIG. 3(c), the FET devices P32, P33 are also configured as a current mirror so that 60 microamps flowing in P32 will produce 60 microamps flowing in P33. This is because the ratio of the channel width of device P33 (25 μm) is the same as the channel width of the reference device P32. This output current is a ratio to the write current used by the current mode write driver, i.e., the output current ISAMPLE 52 is proportional to the current through current mirror device N6. The current ISAMPLE at the output 52 of P33 will be 0.004 the size of the current at the drain of N6. That is, the factor of 0.004 is controlled by the ratio of the "Z" (width to length of each FET device) of N30, N6, N31, P32, and P33. Thus, if the IIN sample current is 1.5 mA, the output current ISAMPLE 52 is proportional and is about 60 microamps. Likewise, if the IIN sample current is 6.57 mA, the output current ISAMPLE 52 should be about 263 microamperes.

The current at the output of P33 is capable of being measured by a measurement circuit implementing using a voltage mode ADC (Analog to Digital Converter). In one embodiment, a precision resistor (not shown) may be connected from the drain 52 of P33 (the output current node) to ground. The voltage developed across the resistor would be measured by the ADC. However, a problem with this method is that no precision resistor is available "on chip" in the CMOS process used to construct the write driver. All that is available are resistors that, for a given type, will "track" each other. Tracking in this context means that the ratio of two resistors will be a constant number over all chips and all environmental conditions.

Figure 4:
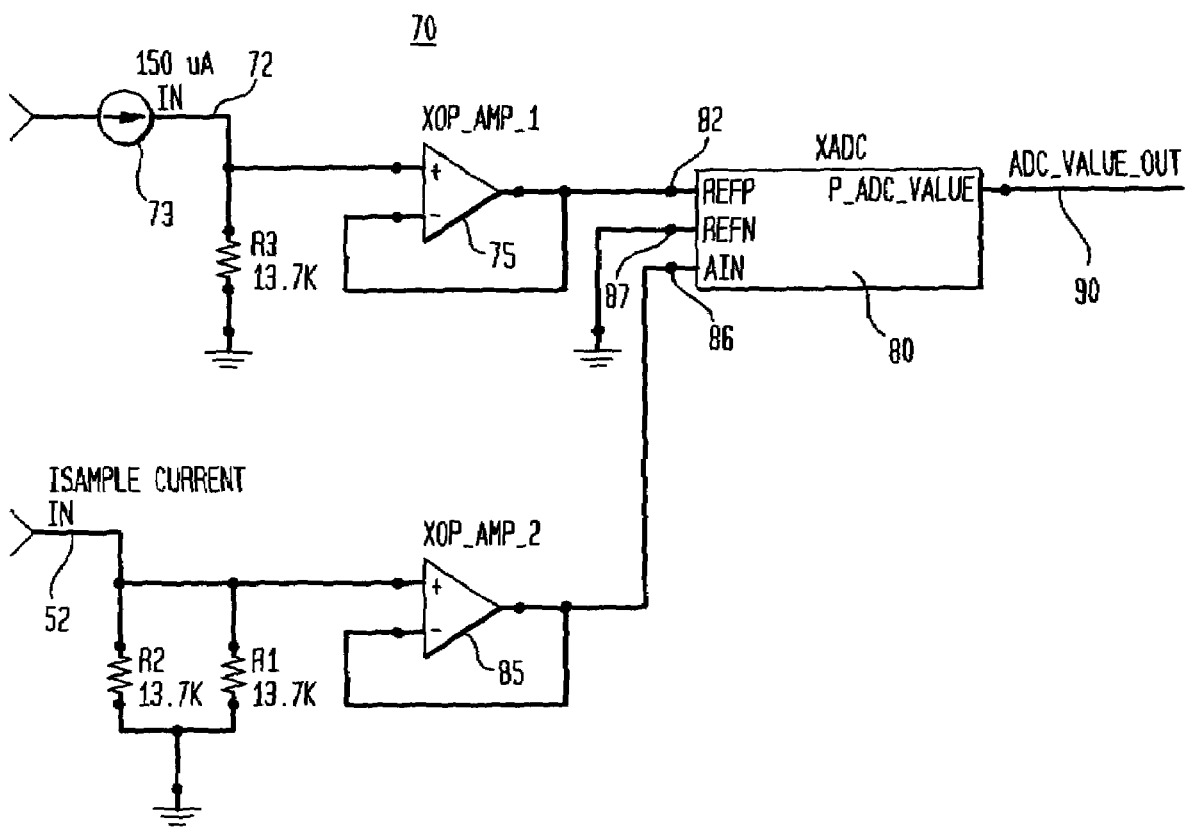

A measurement circuit 70 implementing an ADC 80 according to the preferred embodiment of the invention is now described with reference to FIG. 4. For exemplary purposes, the ADC 80 implemented is of a 10 bit type, but it is understood that an ADC of any bit resolution may be used. For the 10 bit ADC 80 the digital output, labeled "ADC_Value_Out" 90 in FIG. 4, is an integer between 0 and 1023 (base 10). To determine the voltage value at "AIN" the equation $$V_{AIN}=(ADC\_VALUE\_OUT)(V_{REFP})$$

where ADC_VALUE_OUT is the base 10 integer value of the digital output 90 and $V_{REFP}$ is the voltage applied to the REFP input pin 82 of the ADC 80 is used. For the measurement circuit 70, the voltage at $V_{REFP}$ at input pin 82 is:

$$V_{REFP}=(R3)(150e-6)$$

where, for the example described, the 150 microampere current, labeled "150 μA In" 72, is generated on-chip, for example, by a current source 73, and may be set with a high degree of accuracy. It is understood that the 150 μA current value is illustrative and that another reference current value may be input. For instance, the reference current value may be set equal to or a multiple of the anticipated current output 52 of the current mirror 50. The 150 μA current value is selected to produce a reference voltage, REFP, at the input of the ADC that is optimal for its operation. It is understood that the voltage produced at AIN at the ADC may never be larger than REFP. The voltage developed across resistor R3 is obtained and this voltage is input to operational amplifier 75 which is a unity gain buffer. The buffer output 76 is input to the ADC 80 at input REFP 82.

As mentioned, it is difficult to obtain high precision resistor elements in integrated circuit CMOS manufacturing processes. Thus, the value of resistor R3 is not critical. What is critical is the ratio of resistors that "track" each other as resistances may be manufactured on the chip that are relatively close to one another. In the embodiment of the circuit 70 shown, all resistors labeled R1, R2 and R3 are designed to be equal in value (i.e., R1=R2=R3) in units of ohms. The two resistors R1 and R2 are in parallel so their equivalent resistance value is just (R3)/2.

In measurement circuit 70, the voltage at the analog input (AIN) is: $V_{AIN}$=(ISAMPLE)((R3)/2) where ISAMPLE is the sampled write driver current output 52 from current mirror 50 of FIG. 3(c). The voltage developed across the parallel resistors R1 and R2 is obtained, and this voltage is input to operational amplifier 85 which is a unity gain buffer. Again, the value of the discrete resistors R1, R2 and R3 is not critical only that they track each other. The buffer output 86 is input to the ADC 80 at input AIN 86. For the measurement circuit 70, the ADC output value 90 is computed according to a ratio of the sampled write driver current value ((ISAMPLE)((R3)/2)) and the reference current ((150e−6) (R3)) as follows:

$$ADC\_VALUE\_OUT=((ISAMPLE)((R3)/2))/((150e-6)(R3)).$$

It is understood that in this equation, the resistance term, R3, appears in both the numerator and denominator. Thus, only the ratio of the resistance R3 effects the equation not the absolute value of the resistors. Hence, the present invention enables the measurement of the write current when the write driver is operating in the current mode.

More particularly, in FIG. 4, given the REFN input 87 at zero volts (e.g., ground), the ADC output value 90 will be the full ADC value (e.g., 1023) if the voltage REFP 82 is equal to the voltage at AIN 86. If, on the other hand, the AIN voltage is zero, the ADC output value 90 of the ADC circuit is zero. If AIN 86 is halfway between REFN 87 and REFP 82, the bit value output 90 of ADC 80 is half the full value (e.g., about 512). The ADC value is the measure of the sampled current, and may be processed further on-chip, or taken off chip for processing. For example, the ADC output value 90 may be compared against upper and lower limits on-chip, and any errors may be posted.

The current invention thus enables the measuring of the write current in "real time" for a current mode write driver, and may be implemented in an ASIC write driver module, such as for example, the UWD (Universal Write Driver).

While the invention has been particularly shown and described with respect to illustrative and preferred embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A system for measuring in real-time the current of a current mode driver circuit for writing data through a write head, the current mode driver circuit including one or more current mirror circuits for providing a current output in proportion to real-time current flow through said write head during a write operation, the system comprising:

means for converting said current mirror circuit current output into a first voltage;

means for generating a second voltage representing a reference current; and, means for comparing said first voltage to said second voltage and generating an output signal indicating a ratio of said first and second voltages, said ratio being a measure of said current output of said current mirror circuit, wherein said measure of said current output is determined without connecting a current sense measurement device in series connection with said write head.

2. The system for measuring in real-time as claimed in claim 1, wherein said comparing means includes a voltage mode analog to digital converter (ADC) device for generating an output signal as digital bits.

3. The system for measuring in real-time as claimed in claim 1, wherein said means for converting said current mirror circuit current output into a first voltage includes one or more resistors connected to said current output and, said means for generating said second voltage of a reference current includes one or more resistors connected to a reference current source, wherein said one or more resistors are manufactured to have substantially equal values.

4. The system for measuring in real-time as claimed in claim 1, wherein said first and one or more resistors are manufactured on-chip by a CMOS manufacturing process, said current mode driver circuit for writing data through a write head being a circuit on-chip.

5. The system for measuring in real-time as claimed in claim 1, wherein said current mode driver circuit for writing data through said write head is a dual mode write driver.

6. The system for measuring in real-time as claimed in claim 3, wherein said reference current is generated on-chip by said reference current source.

7. The system for measuring in real-time as claimed in claim 2, further comprising:
   a first buffer device for receiving said first voltage and providing said first voltage to said voltage mode ADC; and,
   a second buffer device for receiving said second voltage and providing said second voltage to said voltage mode ADC.

8. The system for measuring in real-time as claimed in claim 7, wherein said first and second buffer devices are unity gain devices.

9. A method for measuring in real-time the current of a current mode driver circuit for writing data through a write head, the current mode driver circuit including one or more current mirror circuits for providing a current output in proportion to real-time current flow through said write head during a write operation, the method comprising:
   a) converting said current mirror circuit current output into a first voltage;
   b) generating a second voltage representing a reference current;
   c) comparing said first voltage value to said second voltage and generating an output signal indicating a ratio of said first and second voltages, said ratio being a measure of said current output of said current mirror circuit, wherein said measure of said current output is determined without connecting a current sense measurement device in series connection with said write head.

10. The method for measuring in real-time as claimed in claim 9, wherein said comparing step includes the step of providing a voltage mode analog to digital converter (ADC) device for generating an output signal as digital bits.

11. The method for measuring in real-time as claimed in claim 9, wherein said step of converting said current mirror circuit current output into a first voltage includes connecting one or more resistors to said current output and obtaining a voltage across said resistors.

12. The method for measuring in real-time as claimed in claim 11, wherein said step of generating said second voltage representing said reference current includes connecting one or more resistors to a reference current source said obtaining a voltage across said one or more second resistors, wherein said one or more resistors are manufactured to have substantially equal values.

13. A disk drive device for performing data read and write operations to a disk storage media, said disk drive including a current mode driver circuit for writing data through a write head, the current mode driver circuit including one or more current mirror circuits for providing a current output in proportion to real-time current flow through said write head during a write operation, the drive device comprising:
   means for converting said current mirror circuit current output into a first voltage;
   means for generating a second voltage representing a reference current; and,
   means for comparing said first voltage value to said second voltage and generating an output signal indicating a ratio of said first and second voltages, said ratio being a measure of said current output of said current mirror circuit, wherein said measure of said current output is determined without connecting a current sense measurement device in series connection with said write head.

14. A tape drive device for performing data read and write operations to a tape storage media, said tape drive including a current mode driver circuit for writing data through a write head, the current mode driver circuit including one or more current mirror circuits for providing a current output in proportion to real-time current flow through said write head during a write operation, the drive device comprising:
   means for converting said current mirror circuit current output into a first voltage;
   means for generating a second voltage representing a reference current; and,
   means for comparing said first voltage value to said second voltage and generating an output signal indicating a ratio of said first and second voltages, said ratio being a measure of said current output of said current mirror circuit, wherein said measure of said current output is determined without connecting a current sense measurement device in series connection with said write head.

* * * * *